(12) United States Patent
Ung et al.

(10) Patent No.: US 10,163,046 B1
(45) Date of Patent: Dec. 25, 2018

(54) METHODS AND SYSTEMS FOR HIGH DENSITY RFID PART SCANNING

(71) Applicant: The Boeing Company, Chicago, IL (US)

(72) Inventors: Kevin Yong Ung, Bellevue, WA (US); Jack Fredrickson, Kirkland, WA (US); William David Kelsey, Issaquah, WA (US); John Jiang Yu, Seattle, WA (US); Edward Li, Seattle, WA (US); Brian James Smith, Bellevue, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 15/631,986

(22) Filed: Jun. 23, 2017

(51) Int. Cl.
| | |
|---|---|
| *G06F 19/00* | (2018.01) |
| *G06Q 30/00* | (2012.01) |
| *G06Q 90/00* | (2006.01) |
| *G06K 17/00* | (2006.01) |
| *G01S 5/02* | (2010.01) |

(52) U.S. Cl.
CPC ........ *G06K 17/0022* (2013.01); *G01S 5/0247* (2013.01); *G01S 5/0284* (2013.01)

(58) Field of Classification Search
USPC ........................................ 235/375, 383, 385
See application file for complete search history.

(56) References Cited

U.S. PATENT DOCUMENTS

| | | | |
|---|---|---|---|
| 7,589,636 B2 | 9/2009 | Ayyagari et al. | |
| 2006/0164246 A1* | 7/2006 | Ghosh | G06K 17/00 340/572.1 |
| 2008/0100439 A1* | 5/2008 | Rinkes | G06K 7/0008 340/572.1 |
| 2008/0100450 A1* | 5/2008 | Ayyagari | B64D 25/18 340/572.7 |
| 2012/0161967 A1* | 6/2012 | Stern | G06Q 10/087 340/572.1 |
| 2014/0074667 A1* | 3/2014 | Smith | G01S 5/12 705/28 |
| 2014/0210598 A1 | 7/2014 | Mitchell et al. | |
| 2014/0263636 A1* | 9/2014 | Jones | G06Q 10/087 235/385 |
| 2017/0032159 A1 | 2/2017 | Troy et al. | |
| 2017/0063476 A1* | 3/2017 | Nair | H04B 17/27 |

\* cited by examiner

*Primary Examiner* — Tuyen K Vo
(74) *Attorney, Agent, or Firm* — Armstrong Teasdale LLP

(57) ABSTRACT

A method for high density radio frequency identifier (RFID) scanning is provided. The method includes receiving a plurality of response signals from a plurality of RFID components. Where each of the plurality of response signals includes a part number and a serial number associated with the RFID component. The method also includes receiving, from a location device, a location of the scanning device. For each of the plurality of RFID components, the method includes determining a component location, the serial number, and the part number based on a corresponding response signal, comparing the component location to an expected location of the RFID component, determining a level of correlation between the serial number associated with the corresponding response signal and a stored serial number associated with the part number, and calculating a confidence score based on the corresponding comparison and the level of correlation.

20 Claims, 11 Drawing Sheets

METHODS AND SYSTEMS FOR HIGH DENSITY RFID PART SCANNING

BACKGROUND

The field of the invention relates generally to high density radio frequency identifier (RFID) part scanning, and more specifically, to scanning and identifying a plurality of closely located parts based on RFID tags.

Known RFID systems utilize RFID readers and RFID tags. The RFID reader interrogates an RFID tag by transmitting a radio signal to the tag and receiving a response radio signal from the tag. The radio response signal may include information about an object to which the RFID tag is attached. Accordingly, by interrogating a plurality of RFID tags, information about a plurality of objects can be retrieved relatively quickly.

However, depending on a location of the RFID tag and/or RFID reader, different power levels may be needed to detect different RFID tags. At least some known RFID readers allow a user to manually change the power level until an RFID tag is detected. However, using such a trial and error process to detect RFID tags may be time-consuming, and may result in missing (i.e., not detecting) one or more RFID tags. Accordingly, in some assemblies, such as vehicles, items are often manually checked rather than using automated RFID systems. However, manually checking items, such as safety equipment and/or maintenance equipment, generally is more time-consuming and/or labor-intensive. Further, manually checking items may result in human error, making manual checks limited in their reliability.

In the known systems, detecting singular RFID tags requires an individual read per part, which can be very time consuming. These systems also work in environments where parts with RFID tags are installed away from other tagged parts. However, in some vehicles, some areas include a high density of parts with RFID tags. Furthermore some parts have metallic surface which can also affect reading RFID tags in a high density area. These conditions may cause a frequency multi-path situation, which may make selecting individual tags difficult and increase the difficulty of adjusting the RF scanning window to capture just one tag at a time.

BRIEF DESCRIPTION

In one aspect, a system for high density radio frequency identifier (RFID) scanning is provided. The system includes a scanning device capable of transmitting an interrogation signal and receiving a plurality of response signals from a plurality of RFID components, a location device capable of determining a location of the scanning device, and a RFID analysis computer device in communication with the scanning device and the location device. The RFID analysis computer device includes at least one processor in communication with at least one memory device. The RFID analysis computer device is programmed to receive, from the scanning device, a plurality of response signals from a plurality of RFID components. Each of the plurality of response signals includes a part number and a serial number associated with the RFID component. The RFID analysis computer device is also programmed to receive, from the location device, a location of the scanning device when the scanning device received the plurality of response signals. For each of the plurality of RFID components, the RFID analysis computer device is further programmed to determine a component location, a serial number, and a part number based on a corresponding response signal of the plurality of response signals, compare the component location to an expected location of the RFID component, determine a level of correlation between the serial number associated with the corresponding response signal for the RFID component and a stored serial number associated with the part number, and calculate a confidence score based on the level of correlation between the serial number associated with the corresponding response signal for the RFID component and the stored serial number associated with the part number. In addition, the RFID analysis computer device is programmed to generate a listing of the plurality of RFID components including the associated confidence score for each of the RFID components.

In another aspect, a method for high density radio frequency identifier (RFID) scanning is provided. The method includes receiving, from a scanning device, a plurality of response signals from a plurality of RFID components. Each of the plurality of response signals includes a part number and a serial number associated with the RFID component. The method also includes receiving, from a location device, a location of the scanning device when the scanning device received the plurality of response signals. For each of the plurality of RFID components, the method further includes determining a component location, a serial number, and a part number based on a corresponding response signal of the plurality of response signals, comparing the component location to an expected location of the RFID component, determining a level of correlation between the serial number associated with the corresponding response signal for the RFID component and a stored serial number associated with the part number, and calculating a confidence score based on the level of correlation between the serial number associated with the corresponding response signal for the RFID component and the stored serial number associated with the part number. In addition, the method includes generating a listing of the plurality of RFID components including the associated confidence score for each of the RFID components.

In yet another aspect, a computer device for high density radio frequency identifier (RFID) scanning is provided. The computer device includes at least one processor in communication with at least one memory device. The at least one processor is programmed to receive, from a scanning device, a plurality of response signals from a plurality of RFID components. Each of the plurality of response signals includes a part number and a serial number associated with the RFID component. The at least one processor is also programmed to receive, from a location device, a location of the scanning device when the scanning device received the plurality of response signals. For each of the plurality of RFID components, the at least one processor is programmed to determine a component location, a serial number, and a part number based on a corresponding response signal of the plurality of response signals, compare the component location to an expected location of the RFID component, determine a level of correlation between the serial number associated with the corresponding response signal for the RFID component and a stored serial number associated with the part number, and calculate a confidence score based on the level of correlation between the serial number associated with the corresponding response signal for the RFID component and the stored serial number associated with the part number. The at least one processor is further programmed to generate a listing of the plurality of RFID components including the associated confidence score for each of the RFID components.

BRIEF DESCRIPTION OF THE DRAWINGS

FIG. 1 is a schematic diagram of an exemplary RFID system.

FIG. 2 is a block diagram of an exemplary RFID reader that may be used with the system shown in FIG. 1.

FIG. 3 is a simplified block diagram of an example RFID analysis system used for analyzing RFID signals received simultaneously from a plurality of plurality of RFID tags accordance with FIG. 1.

FIG. 4 illustrates an example configuration of a client system shown in FIG. 3, in accordance with one embodiment of the present disclosure.

FIG. 5 illustrates an example configuration of a server system shown in FIG. 3, in accordance with one embodiment of the present disclosure.

FIG. 6 is a flow chart of a process for creating a list of "as-designed" parts expected to be installed in a vehicle using the systems shown in FIGS. 1 & 3.

FIG. 7 is a flow chart of a process for creating a list of "as-delivered" parts expected to be installed in a vehicle using the systems shown in FIGS. 1 & 3.

FIG. 8 is a flow chart of a process for creating a list of scanned parts detecting in a vehicle using the systems shown in FIGS. 1 & 3.

FIG. 9 is a flow chart of a process for pattern matching the "as-designed," "as-delivered," and scanned parts in a vehicle using the systems shown in FIGS. 1 & 3.

FIG. 10 is a flow chart of a process for high density radio frequency identifier (RFID) scanning using the systems shown in FIGS. 1 & 3.

FIG. 11 is a diagram of components of one or more example computing devices that may be used in the systems shown in FIGS. 1 & 3.

Figure 1:
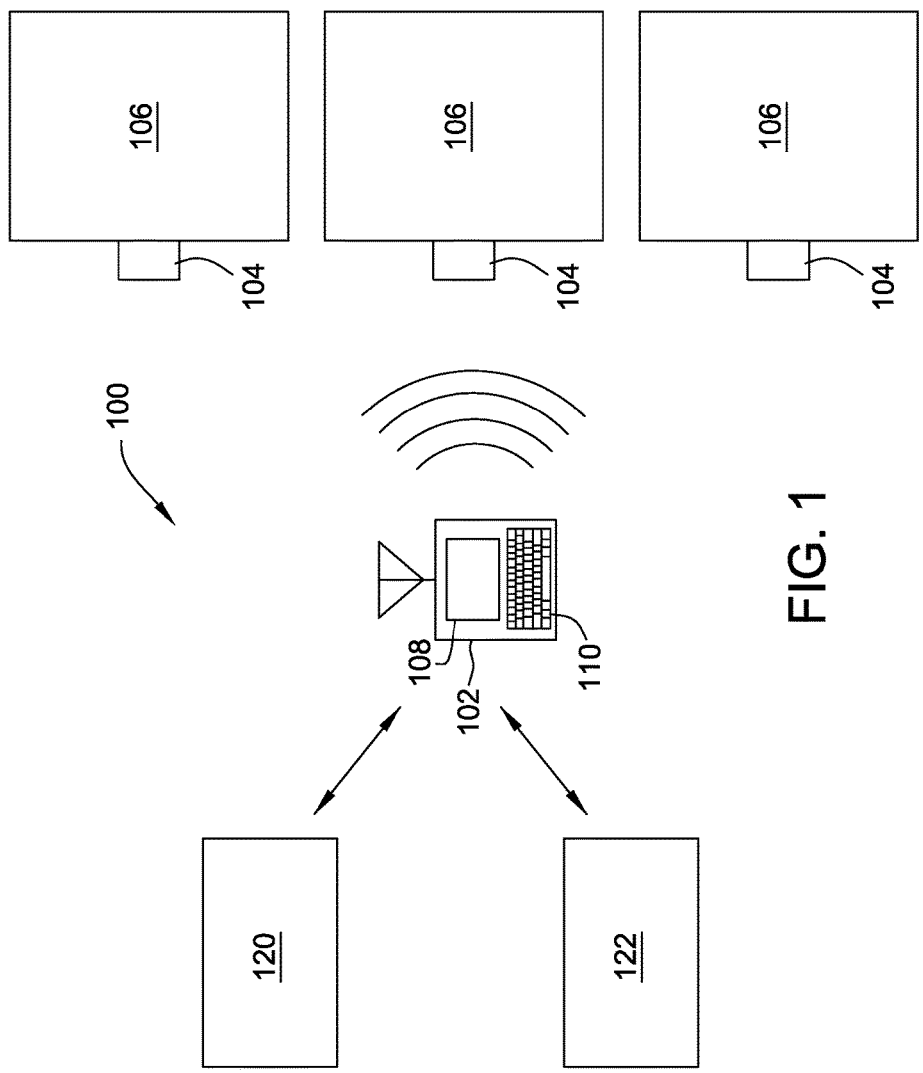
FIGS. 1-11 show example embodiments of the methods and systems described herein.

Unless otherwise indicated, the drawings provided herein are meant to illustrate features of embodiments of this disclosure. These features are believed to be applicable in a wide variety of systems comprising one or more embodiments of this disclosure. As such, the drawings are not meant to include all conventional features known by those of ordinary skill in the art to be required for the practice of the embodiments disclosed herein.

DETAILED DESCRIPTION

The implementations described herein relate to radio frequency identifier ("RFID") part scanning, and more specifically, to scanning, identifying, and verifying a plurality of closely located parts with RFID tags. More specifically, an RFID analysis computer device (also known as an RFID analysis server) analyzes received RFID signals to locate and identify the parts in an area with a high concentration of RFID tags. The RFID analysis computer device compares the identified parts to potential parts at that location to confirm that the proper parts are identified.

Described herein are computer systems such as the RFID analysis computer devices and related computer systems. As described herein, all such computer systems include a processor and a memory. However, any processor in a computer device referred to herein may also refer to one or more processors wherein the processor may be in one computing device or in a plurality of computing devices acting in parallel. Additionally, any memory in a computer device referred to herein may also refer to one or more memories wherein the memories may be in one computing device or in a plurality of computing devices acting in parallel.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are not intended to limit in any way the definition and/or meaning of the term "processor."

As used herein, the term "database" may refer to either a body of data, a relational database management system (RDBMS), or to both. As used herein, a database may include any collection of data including hierarchical databases, relational databases, flat file databases, object-relational databases, object-oriented databases, and any other structured or unstructured collection of records or data that is stored in a computer system. The above examples are not intended to limit in any way the definition and/or meaning of the term database. Examples of RDBMS's include, but are not limited to, Oracle® Database, MySQL, IBM® DB2, Microsoft® SQL Server, Sybase®, and PostgreSQL. However, any database may be used that enables the systems and methods described herein. (Oracle is a registered trademark of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.)

In one embodiment, a computer program is provided, and the program is embodied on a computer readable medium. In an example embodiment, the system is executed on a single computer system, without requiring a connection to a server computer. In a further embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). The application is flexible and designed to run in various different environments without compromising any major functionality. In some embodiments, the system includes multiple components distributed among a plurality of computing devices. One or more components may be in the form of computer-executable instructions embodied in a computer-readable medium.

As used herein, an element or step recited in the singular and preceded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are examples only and thus, are not limiting as to the types of memory usable for storage of a computer program.

Furthermore, as used herein, the term "real-time" refers to at least one of the time of occurrence of the associated events, the time of measurement and collection of predetermined data, the time to process the data, and the time of a system response to the events and the environment. In the embodiments described herein, these activities and events occur substantially instantaneously.

The systems and processes are not limited to the specific embodiments described herein. In addition, components of each system and each process can be practiced independent and separate from other components and processes described herein. Each component and process also can be used in combination with other assembly packages and processes.

FIG. 1 is a schematic diagram of an exemplary radio-frequency identification (RFID) system 100 that includes an RFID reader 102 and at least one RFID tag 104 attached to and/or included as part of an object 106. In the exemplary implementation, RFID reader 102 is a portable, handheld reader. Alternatively, RFID reader 102 is a fixed reader that is mounted and/or installed in an operating environment, such as a vehicle. RFID reader 102 includes a display 108 for displaying information and a user input device 110, such as a keyboard, for receiving input from a user.

RFID reader 102 is configured to transmit an interrogation radio signal at a plurality of power levels, as described in detail herein. Further, RFID reader 102 is configured to integrate position data and configuration data to determine confirm the location of one or more objects 106 including RFID tags 104, as described in detail herein.

Interrogating RFID tag 104 using RFID reader 102 enables identification of object 106. To interrogate RFID tag 104, RFID reader 102 transmits an interrogation radio signal. The interrogation radio signal is capable of being transmitted at a plurality of power levels, as described in detail herein. In the exemplary embodiment, the interrogation radio signal is transmitted at a maximum power level. Further, RFID reader 102 is configured to integrate position data and configuration data to confirm the location of one or more RFID tags 104, and accordingly the corresponding object 106, as described in detail herein.

When RFID tag 104 receives the transmitted radio signal from RFID reader 102, RFID tag 104 emits a response radio signal. Specifically, the RFID tag 104 includes a receiver (not shown) for receiving the interrogation radio signal, and a transmitter (not shown) for transmitting the response radio signal. The response radio signal includes identification information related to object 106. For example, the response radio signal may include a unique tag serial number, an expiration date of object 106, a stock number of object 106, a lot or batch number of object 106, a position and/or location of object 106, and/or other information pertinent to object 106.

Object 106 may be any article for which it is desirable to obtain information about the article. For example, in some implementations, system 100 is implemented onboard a moving vehicle, such as aircraft 10 (shown in FIG. 1). In an aircraft operating environment, object 106 may be aircraft maintenance equipment, aircraft safety equipment, and/or other aircraft articles. For example, object 106 could be a seat, seatbelt, a flotation device, an oxygen mask, a fire extinguisher, a drinks cart, a piece of avionics equipment, and/or any other suitable article.

The response radio signal transmitted from one or more RFID tags 104 is received by RFID reader 102. In the exemplary implementation, RFID reader 102 transmits the received radio response signal to a computer system (not shown) running software for extracting the identification information from the response radio signal. Alternatively, RFID reader 102 may include suitable software extracting the identification information from the radio response signal.

In the exemplary implementation, RFID tag 104 is a passive RFID tag that uses radio energy in the interrogation radio signal to generate and emit the response radio signal. Alternatively, RFID tag 104 may be an active RFID tag that includes a battery that periodically transmits the response radio signal. Further, RFID tag 104 may be read-only or read/write, in which data can be written into RFID tag 104.

Although FIG. 1 shows only three RFID tag 104 attached to one object 106, it will be appreciated that system 100 may include any number of RFID tags 104 each attached to a respective object. Accordingly, RFID reader 102 is capable of reading a plurality of RFID tags 104 to acquire identification information for a plurality of objects 106.

The detection range of RFID reader 102 depends on a power level of the transmitted interrogation signal. That is, the higher the power level, the further away RFID reader 102 can detect RFID tags 104. Accordingly, in the exemplary implementation, the power level is controlled to the maximum level to facilitate efficient and accurate detection of the largest plurality of RFID tags 104 possible at once, as described in detail herein.

In the exemplary implementation, RFID reader 102 is in communication with a configuration database 120 and a position system 122. By integrating data received from configuration database 120 and position system 122, when RFID reader 102 detects an RFID tag 104, RFID reader 102 can confirm the location of RFID tag 104, as described in detail herein.

Figure 2:
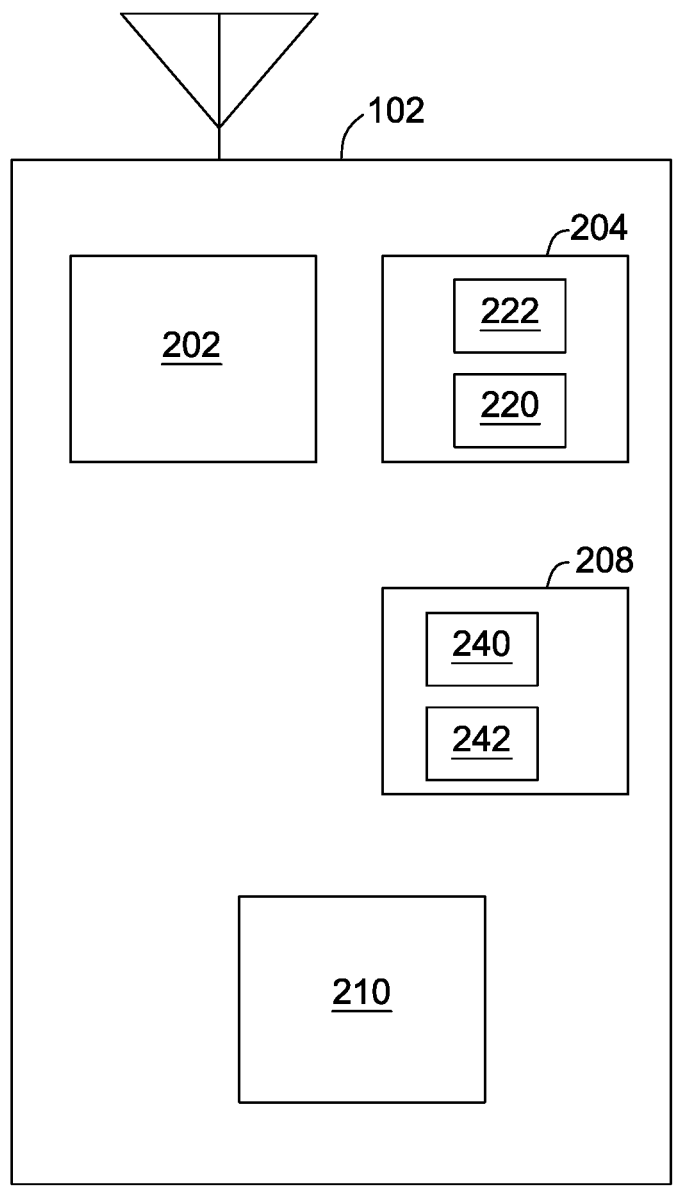

FIG. 2 is a block diagram of RFID reader 102 that may be used with RFID system 100 (shown in FIG. 1). In the exemplary implementation, RFID reader 102 includes a transmitter/receiver module 202, a control module 204, a user interface module 208, and a communications module 210.

Transmitter/receiver module 202 transmits interrogation radio signal and receives response radio signal from RFID tag 104 (shown in FIG. 1). In the exemplary implementation, transmitter/receiver module 202 is capable of transmitting and interrogation radio signals at a plurality of power levels.

Control module 204 instructs transmitter/receiver module 202 to transmit the interrogation radio signal at a specified power level. In the exemplary embodiment, control module 204 is configured to instruct transmitter/receiver module 202 to transmit the interrogation radio signal at the maximum power level. In some embodiments, control module 204 may adjust the power level to prevent interference or other issues with reading a plurality of RFID tags 104. In the exemplary implementation, control module 204 includes at least one memory device 220 and a processing device 222 that is coupled to memory device 220 for executing instructions. In some implementations, executable instructions are stored in memory device 220. Control module 204 performs one or more operations described herein by programming processing device 222. For example, processing device 222 may be programmed by encoding an operation as one or more executable instructions and by providing the executable instructions in memory device 220.

Processing device 222 may include one or more processing units (e.g., in a multi-core configuration). Further, processing device 222 may be implemented using one or more heterogeneous processor systems in which a main processor is present with secondary processors on a single chip. As another illustrative example, processing device 222 may be a symmetric multi-processor system containing multiple processors of the same type. Further, processing device 222 may be implemented using any suitable programmable circuit including one or more systems and microcontrollers, microprocessors, reduced instruction set circuits (RISC), application specific integrated circuits (ASIC), programmable logic circuits, field programmable gate arrays (FPGA), and any other circuit capable of executing the functions described herein. Processing device 222 determines what power level control module 204 should instruct transmitter/receiver module 202 to transmit interrogation radio signals at.

Memory device 220 is one or more devices that enable information such as executable instructions and/or other data to be stored and retrieved. Memory device 220 may include one or more computer readable media, such as, without limitation, dynamic random access memory (DRAM), static random access memory (SRAM), a solid state disk, and/or a hard disk. Memory device 220 may be configured to store, without limitation, application source code, application object code, source code portions of interest, object code portions of interest, configuration data, execution events and/or any other type of data.

User interface module 208 includes an input device 240, such as user input device 110 (shown in FIG. 2). Input device 240 may include a toggle switch, a touchscreen, keypad and/or keyboard, and/or mouse that enables a user to enter information and interact with RFID reader 102. A user can use input device 240 to select which object 106 (and corresponding RFID tag 104) RFID reader 102 should attempt to detect. Further, using input device 240, a user can manually input a location of the RFID reader 102.

In the exemplary implementation, user interface module 208 also includes a display device 242, such as display 108 (shown in FIG. 1) that enables a user to view information pertinent to the operation of RFID reader 102. For example, display device 242 may display the current location of RFID reader 102, the current interrogation radio signal power level, and/or the currently detected RFID tag 104/object 106. Display device 242 may include, for example, a cathode ray tube (CRT), a liquid crystal display (LCD), an organic LED (OLED) display, and/or an "electronic ink" display. In some implementations, a touch screen functions as both display device 242 and input device 240.

Communications module 210 transmits and receives data for RFID reader 102. Communications module 210 transmits and receives data using any suitable communications medium, including, but not limited to, a wired and/or wireless network, an Iridium satellite network, radio, 3G, Controller Pilot Data Link (CPDL), and Tactical Digital Information Links (TADIL). In the exemplary implementation, communications module 210 transmits and receives data to and from configuration database 120 and position system 122 (both shown in FIG. 2). For example, communications module 210 may communicate with position system 122 to determine a location of RFID reader 102. Further, communications module 210 may receive configuration data, such as a configuration of aircraft 10, from configuration database 120.

Data transmitted and/or received by communications module 210 may also include identification information received from RFID tag 104 (shown in FIG. 1). In implementations where RFID reader 102 is located onboard a vehicle, communications module 210 may facilitate communications and integration between RFID reader 102 and one or more vehicle systems. For example, in at least some implementations, communications module 210 communicates with one or more aircraft flight and/or navigation systems.

Figure 3:
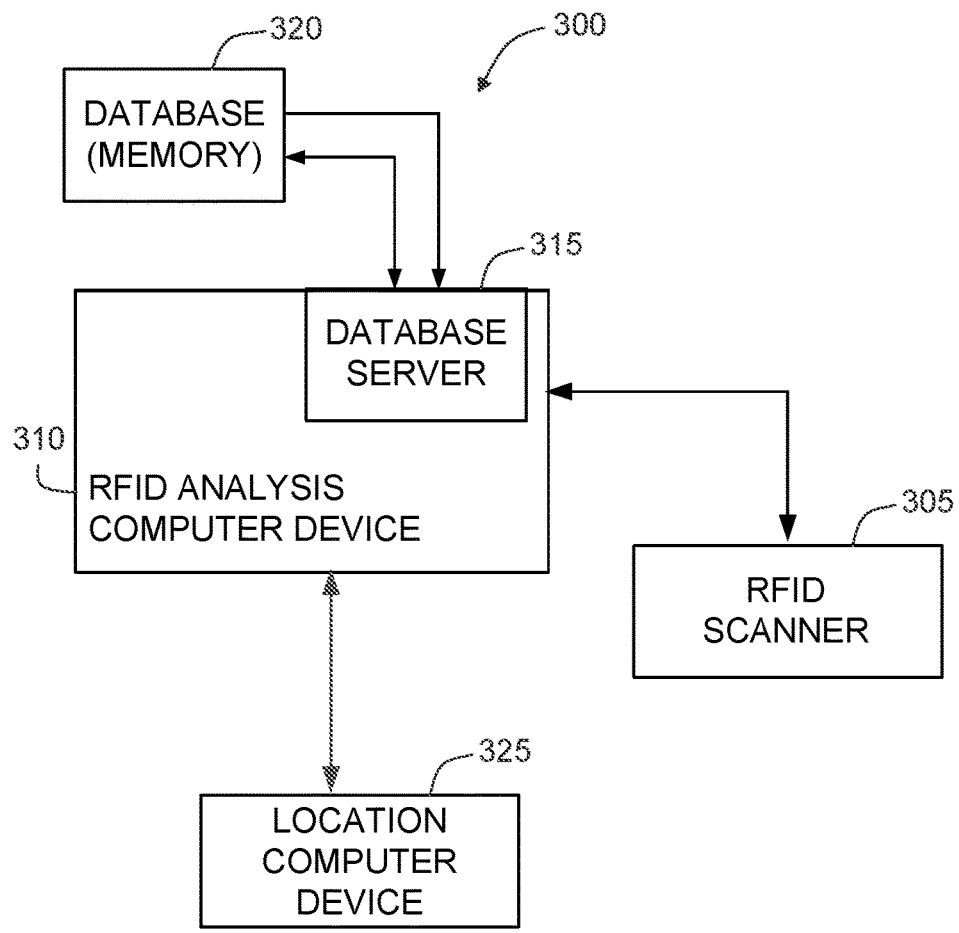

FIG. 3 is a simplified block diagram of an example RFID analysis system 200 used for analyzing RFID signals received simultaneously from a plurality of RFID tags 104 (shown in FIG. 1). In the example embodiment, system 300 may be used for detecting and cataloging RFID tags 104 from areas that are densely populated with RFID tags 104 and objects 106, such as the avionics bay of an aircraft. As described below in more detail, a RFID analysis computer device 310 is configured to receive, from the scanning device 305, a plurality of response signals from a plurality of RFID components 106. Each of the plurality of response signals includes a part number and a serial number associated with the RFID component 106. RFID analysis computer device 310 is also configured to receive a location of a scanning device 305 when scanning a plurality of RFID components 106. For each of the plurality of RFID components, RFID analysis computer device 310 is also configured to determine a component location, a serial number, and a part number based on a corresponding response signal of the plurality of response signals. For each of the plurality of RFID components, RFID analysis computer device 310 is further configured to compare the component location to an expected location of the RFID component 106. For each of the plurality of RFID components, RFID analysis computer device 310 is also configured to determine a level of correlation between the serial number associated with the corresponding response signal and a stored serial number associated with the part number. In addition, RFID analysis computer device 310 is configured to calculate a confidence score for each RFID component 106 based on the corresponding comparison. And RFID analysis computer device 310 is also configured to generate a listing of the plurality of RFID components 106 including the associated confidence score.

In the example embodiment, an RFID scanner 305, such as RFID reader 102 (shown in FIG. 1), is in communication with RFID analysis computer device 310. In some embodiments, RFID scanner 305 is an individual part that is attached to a user computer device (not shown), where RFID scanner 305 communicates with RFID analysis computer device 310 through user computer device. In these embodiments, user computer device is a computer that include a web browser or a software application to enable user computer device to access RFID analysis computer device 310 using the Internet or a network. More specifically, user computer devices are communicatively coupled to RFID analysis computer device 310 through many interfaces including, but not limited to, at least one of a network, such as the Internet, a local area network (LAN), a wide area network (WAN), or an integrated services digital network (ISDN), a dial-up-connection, a digital subscriber line (DSL), a cellular phone connection, and a cable modem. User computer devices can be any device capable of accessing the Internet, or another network, including, but not limited to, a desktop computer, a laptop computer, a personal digital assistant (PDA), a cellular phone, a smartphone, a tablet, a phablet, or other web-based connectable equipment. In other embodiments, RFID scanner 305 is directly wired to RFID analysis computer device 310. In still further embodiments, RFID analysis computer device 310 includes a plurality of computer devices connected through many interfaces to allow RFID scanner 305 to read signals from RFID tags 104 and analyze those signals as described herein.

RFID analysis computer device 310 includes one or more computer devices configured to perform as described herein. In the example embodiment, RFID analysis computer device 310 includes one or more server systems configured to communicate with RFID scanner 305 and location computer device 325. In some embodiments, RFID analysis computer device 310 is remote from at least one of RFID scanner 305, database server 315, and location computer device 325 and communicates with the remote computer device (either RFID scanner 305, database server 315, and location computer device 325) through the Internet. More specifically, RFID analysis computer device 310 is communicatively coupled to the Internet through many interfaces including, but not limited to, at least one of a network, such as a local area network (LAN), a wide area network (WAN), or an integrated services digital network (ISDN), a dial-up-connection, a digital subscriber line (DSL), a cellular phone connection, and a cable modem. RFID analysis computer device 310 can be any device capable of accessing the Internet, or another network, including, but not limited to, a desktop computer, a laptop computer, a personal digital assistant (PDA), a cellular phone, a smartphone, a tablet, a phablet, or other web-based connectable equipment.

A database server 315 is communicatively coupled to a database 220 that stores data. In one embodiment, database 320 includes as-designed configurations, as-delivered configurations, location information, part numbers, and serial numbers. In the example embodiment, database 320 is stored remotely from RFID analysis computer device 310. In some embodiments, database 320 is decentralized. In the example embodiment, a person can access database 320 via a user computer device by logging onto RFID analysis computer device 310, as described herein.

Location computer devices 325 include any device or combination of devices capable of determining the location of RFID scanner 305. In the example embodiment, RFID scanner 305 includes a location, a height from the ground, and a direction of orientation. When RFID scanner 305 transmits an interrogation radio signal, location computer device 325 is capable of determining where in a vehicle RFID scanner 305 and the direction that RFID scanner 305 is pointed. Location computer device 325 is further configured to communicate that determined location and orientation to RFID analysis computer device 310 to determine one or more RFID tags 104 of one or more objects 106 that should respond to RFID scanner's interrogation radio signal. In the example embodiment, location computer device 325 is in communication with RFID analysis computer device 310. In the exemplary embodiment, location computer device 325 may include, for example, a global positioning system (GPS) sensor, a sensor located within RFID scanner 305 (e.g., an active RFID tag), a multilateration navigation system, accelerometer, and/or an inertial reference unit (IRU). To determine the location and/or orientation of RFID scanner 305, RFID analysis computer device 310 may communicate with location computer device 325 continuously, periodically, upon a user request input using user interface module 208, and/or whenever RFID scanner 305 transmits an interrogation radio signal. More specifically, location computer device 325 is communicatively coupled to RFID analysis computer device 310 through many interfaces including, but not limited to, at least one of the Internet, a network, such as a local area network (LAN), a wide area network (WAN), or an integrated services digital network (ISDN), a dial-up-connection, a digital subscriber line (DSL), a cellular phone connection, and a cable modem.

Figure 4:
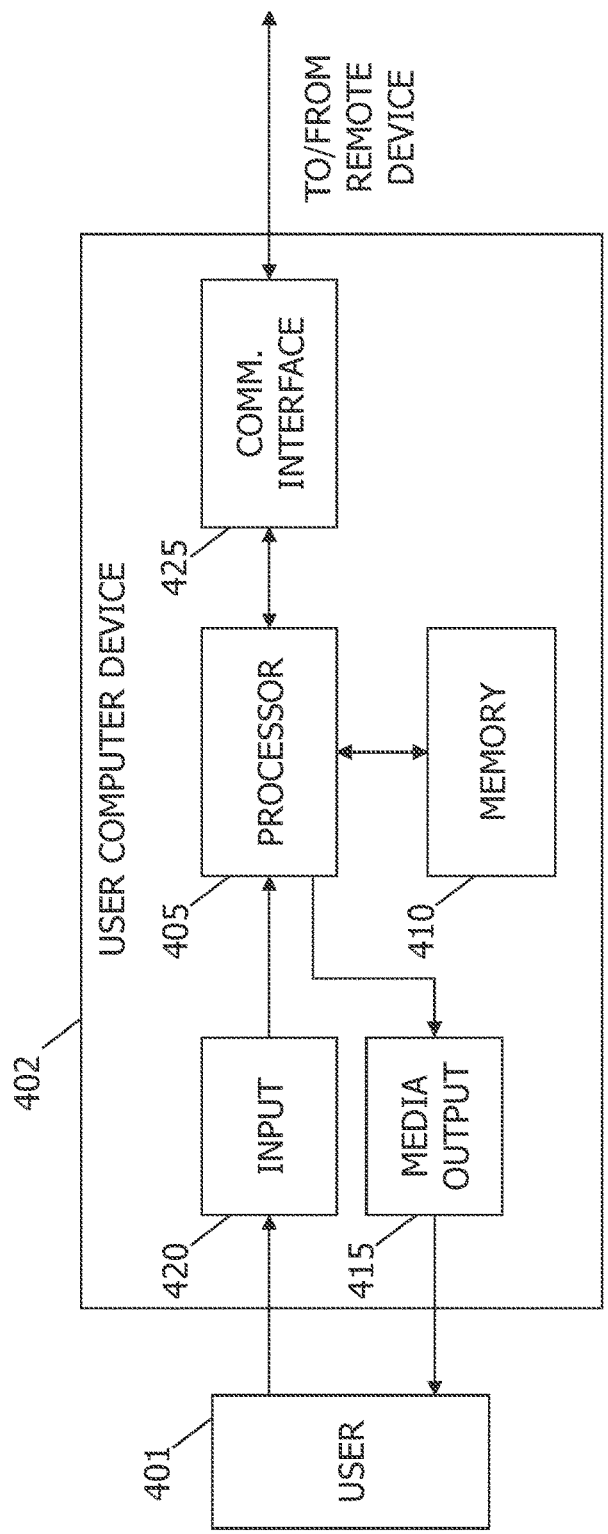

FIG. 4 illustrates an example configuration of a client system shown in FIG. 3, in accordance with one embodiment of the present disclosure. User computer device 402 is operated by a user 401. User computer device 402 may include, but is not limited to, RFID reader 102 (shown in FIG. 1), RFID scanner 305, RFID analysis computer device 310, and location computer device 325 (all shown in FIG. 3). User computer device 402 includes a processor 405 for executing instructions. In some embodiments, executable instructions are stored in a memory area 410. Processor 405 may include one or more processing units (e.g., in a multi-core configuration). Memory area 410 is any device allowing information such as executable instructions and/or transaction data to be stored and retrieved. Memory area 410 may include one or more computer-readable media.

User computer device 402 also includes at least one media output component 415 for presenting information to user 401. Media output component 415 is any component capable of conveying information to user 401. In some embodiments, media output component 415 includes an output adapter (not shown) such as a video adapter and/or an audio adapter. An output adapter is operatively coupled to processor 405 and operatively coupleable to an output device such as a display device (e.g., a cathode ray tube (CRT), liquid crystal display (LCD), light emitting diode (LED) display, or "electronic ink" display) or an audio output device (e.g., a speaker or headphones). In some embodiments, media output component 415 is configured to present a graphical user interface (e.g., a web browser and/or a client application) to user 401. A graphical user interface may include, for example, one or more potential tags associated with an RFID signal. In some embodiments, user computer device 402 includes an input device 420 for receiving input from user 401. User 401 may use input device 420 to, without limitation, select and/or enter a part number associated with the RFID signal. Input device 420 may include, for example, a keyboard, a pointing device, a mouse, a stylus, a touch sensitive panel (e.g., a touch pad or a touch screen), a gyroscope, an accelerometer, a position detector, a biometric input device, and/or an audio input device. A single component such as a touch screen may function as both an output device of media output component 415 and input device 420.

User computer device 402 may also include a communication interface 425, communicatively coupled to a remote device such as RFID analysis computer device 310 (shown in FIG. 3). Communication interface 425 may include, for example, a wired or wireless network adapter and/or a wireless data transceiver for use with a mobile telecommunications network.

Stored in memory area 410 are, for example, computer-readable instructions for providing a user interface to user 401 via media output component 415 and, optionally, receiving and processing input from input device 420. The user interface may include, among other possibilities, a web browser and/or a client application. Web browsers enable users, such as user 401, to display and interact with media and other information typically embedded on a web page or a website from RFID analysis computer device 310. A client application allows user 401 to interact with, for example, RFID analysis computer device 310. For example, instructions may be stored by a cloud service and the output of the execution of the instructions sent to the media output component 415.

Figure 5:
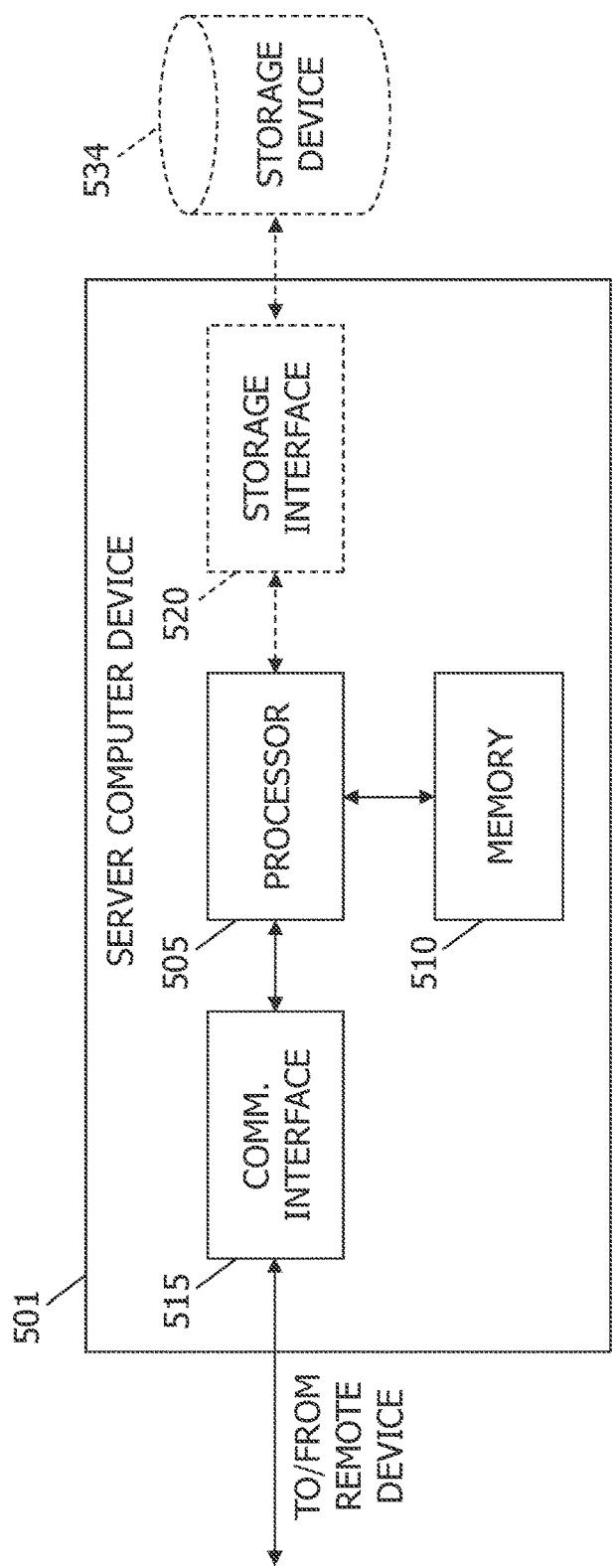

FIG. 5 illustrates an example configuration of a server system shown in FIG. 3, in accordance with one embodiment of the present disclosure. Server computer device 501 may include, but is not limited to, database server 315, RFID analysis computer device 310, and location computer device 325 (all shown in FIG. 3). Server computer device 501 also includes a processor 505 for executing instructions. Instructions may be stored in a memory area 510. Processor 505 may include one or more processing units (e.g., in a multi-core configuration).

Processor 505 is operatively coupled to a communication interface 515, such that server computer device 501 is capable of communicating with a remote device such as another server computer device 501, RFID scanner 305, location computer device 325, or RFID analysis computer device 310 (all shown in FIG. 3). For example, communication interface 515 may receive location information from location computer devices 305 via the Internet.

Processor 505 may also be operatively coupled to a storage device 534. Storage device 534 is any computer-operated hardware suitable for storing and/or retrieving data, such as, but not limited to, data associated with database 320 (shown in FIG. 3). In some embodiments, storage device 534 is integrated in server computer device 501. For example, server computer device 501 may include one or more hard disk drives as storage device 534. In other embodiments, storage device 534 is external to server computer device 501 and may be accessed by a plurality of server computer devices 501. For example, storage device 534 may include a storage area network (SAN), a network attached storage (NAS) system, and/or multiple storage units such as hard disks and/or solid state disks in a redundant array of inexpensive disks (RAID) configuration.

In some embodiments, processor 505 is operatively coupled to storage device 534 via a storage interface 520. Storage interface 520 is any component capable of providing processor 505 with access to storage device 534. Storage interface 520 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 505 with access to storage device 534.

Processor 505 executes computer-executable instructions for implementing aspects of the disclosure. In some embodiments, processor 505 is transformed into a special purpose microprocessor by executing computer-executable instructions or by otherwise being programmed. For example, processor 505 is programmed with the instructions such as are illustrated below.

Figure 6:
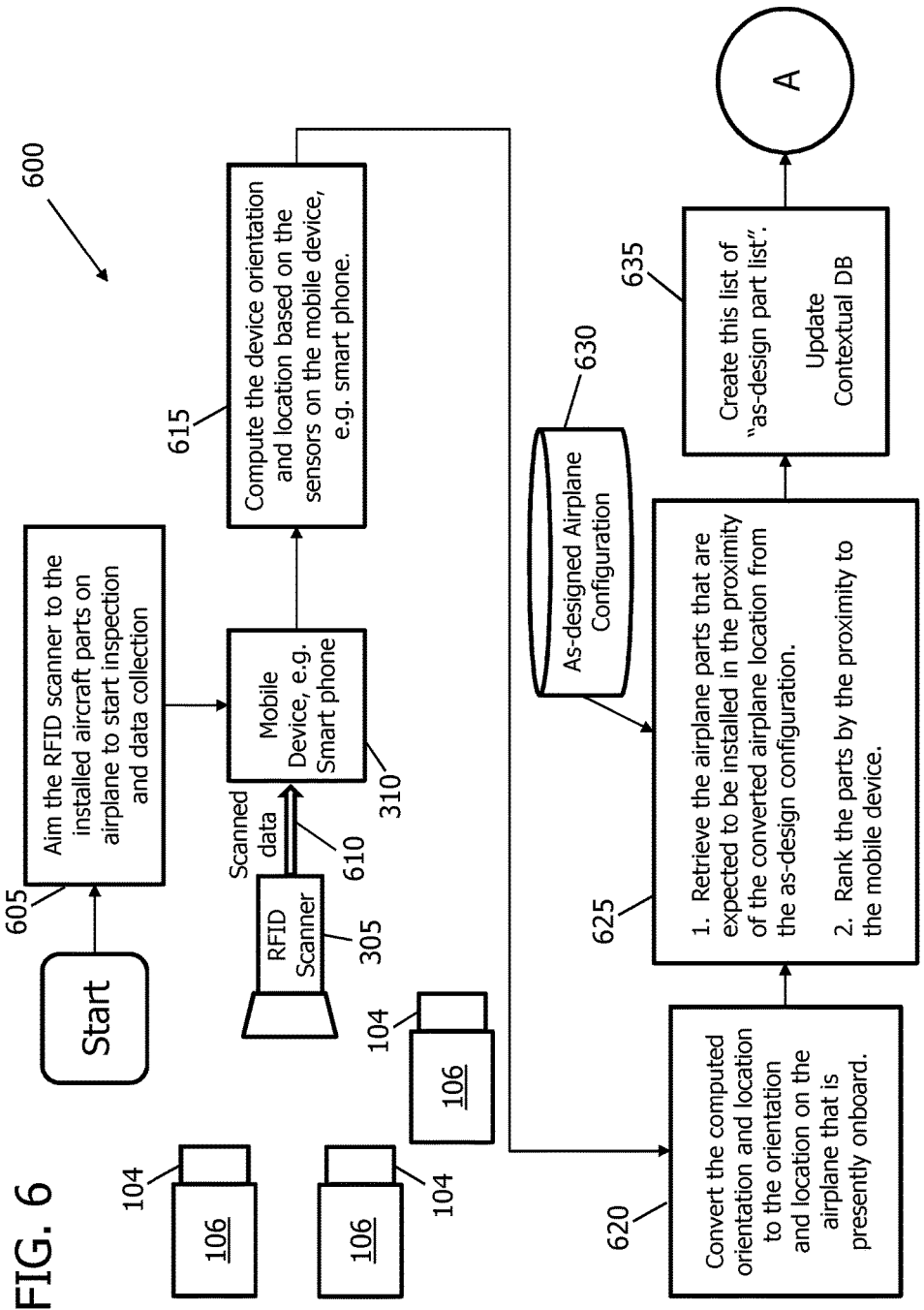

FIG. 6 is a flow chart of a process 600 for creating a list of "as-designed" parts expected to be installed in a vehicle using the systems 100 and 300 (shown in FIGS. 1 & 3). In the example embodiment, process 600 is performed by RFID analysis computer device 310 (shown in FIG. 3).

In the example embodiment, a user is in possession of a mobile computer device that includes RFID scanner 305. In the example embodiment, the mobile computer device is RFID analysis computer device 310. In other embodiments, the mobile computer device is in communication with RFID analysis computer device 310. In the example embodiment, the user aims 605 RFID scanner 305 at a plurality of objects 106 that are tagged with RFID tags 104. In at least one embodiment, the tagged objects 106 are aircraft parts on an airplane to be inspected.

RFID analysis computer device 310 computes 615 the orientation and location of RFID scanner 305 based on sensors on the mobile device. In the example embodiment, a layout of the vehicle is stored in a database, such as database 320 (shown in FIG. 3). RFID analysis computer device 310 converts 620 the orientation and location into the orientation and location of the RFID scanner 305 onboard the vehicle. For example, RFID analysis computer device 310 may determine that RFID scanner 305 is in the forward galley of an aircraft and is pointed towards the starboard side of the aircraft.

In the example embodiment, RFID analysis computer device 310 is in communication with database 320 which is storing an "as-designed" configuration 630 of the vehicle. In this embodiment, "as-designed" configuration 630 includes information about the parts and components of the vehicle based on the design by the engineers. This information includes, but is not limited to, part manufacturers, part numbers, and installation locations on the vehicle.

Based on the location of RFID scanner 305, RFID analysis computer device 310 retrieves 625 from database 320 the parts that are designed to be installed in proximity to RFID scanner's location in the vehicle. RFID analysis computer device 310 then ranks the parts based on their distance from the location of RFID scanner 305. RFID analysis computer device 310 creates 635 a list of the parts that in proximity to RFID scanner 305 and updates a contextual database for this vehicle with the list.

In some embodiments, RFID analysis computer device 310 virtually replicates the vehicle and simulates scanning of the parts by having RFID scanner 305 in different positions and orientations in the vehicle to generate the lists of parts associated with each location.

Figure 7:
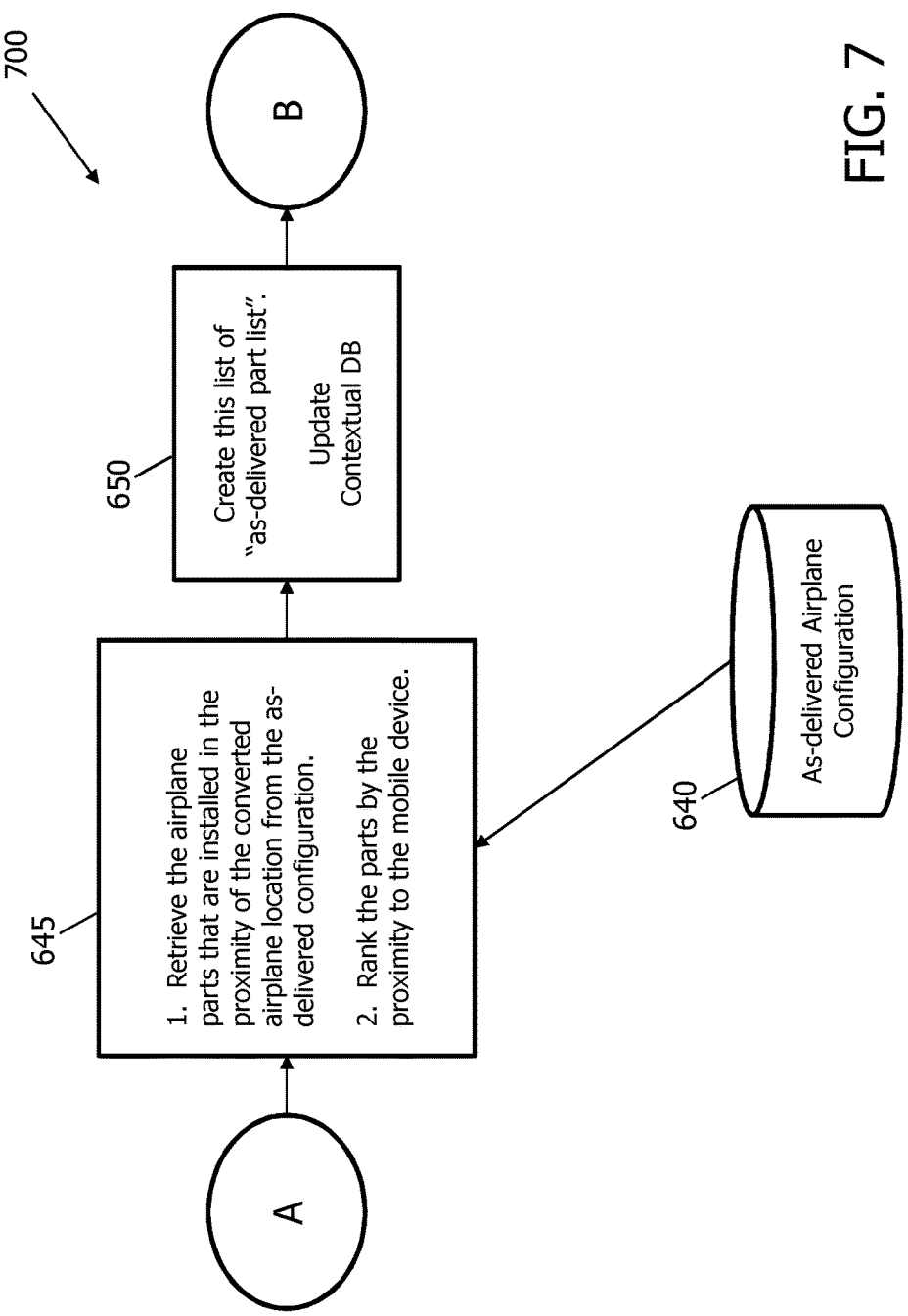

FIG. 7 is a flow chart of a process 700 for creating a list of "as-delivered" parts expected to be installed in a vehicle using the systems 100 and 300 (shown in FIGS. 1 & 3). In the example embodiment, process 700 is performed by RFID analysis computer device 310 (shown in FIG. 3).

In the example embodiment, RFID analysis computer device 310 is in communication with database 320 (shown in FIG. 3) which is storing an "as-delivered" configuration 640 of the vehicle. In this embodiment, "as-delivered" configuration 640 includes information about the parts and components of the vehicle that was collected from past vehicles that have been completed and potentially previously delivered to customers. This information includes, but is not limited to, serial numbers, dates of manufacture, part manufacturers, part numbers, and installation locations on the vehicle.

Based on the location of RFID scanner 305, RFID analysis computer device 310 retrieves 645 from database 320 the parts that have been installed in proximity to RFID scanner's location in the vehicle in the past. RFID analysis computer device 310 then ranks the parts based on their distance from the location of RFID scanner 305. RFID analysis computer device 310 creates 650 a list of the parts that in proximity to RFID scanner 305 and updates a contextual database for this vehicle with the list.

Accordingly, at this point, the contextual database includes information about the parts that were designed to be in proximity to RFID scanner's location in the vehicle and information about the parts that have been installed in proximity to RFID scanner's location in past vehicles. In some further embodiments, RFID analysis computer device 310 includes information about parts that were installed in this vehicle in the past, such as those detected in a previous scan or inspection of the vehicle.

Figure 8:
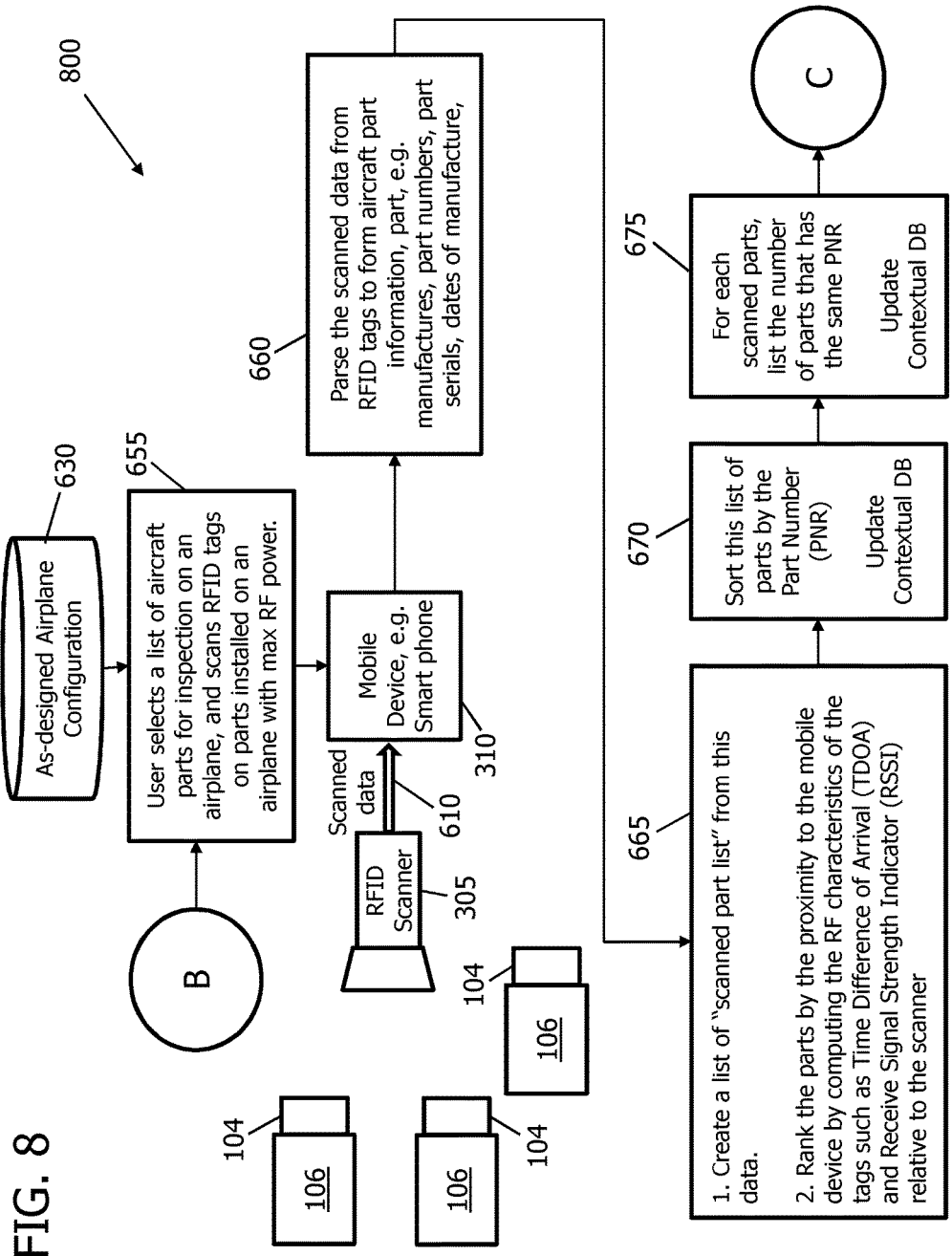

FIG. 8 is a flow chart of a process 800 for creating a list of scanned parts detecting in a vehicle using the systems 100 and 300 (shown in FIGS. 1 & 3). In the example embodiment, process 800 is performed by RFID analysis computer device 310 (shown in FIG. 3).

In the example embodiment, the user retrieves 655 the "as-designed" configuration 630 of the vehicle and instructs 655 RFID scanner 305 to scan at maximum RF power. RFID scanner 305 transmits an interrogation radio signal at maximum RF power and receives responses from the plurality of RFID tags 104. RFID scanner 305 transmits that scanned data 610 (the plurality of response radio signals) to RFID analysis computer device 310.

RFID analysis computer device 310 parses 660 the scanned data 610 from the RFID tags 104 to determines part information, such as, but not limited to, manufacturers, part numbers, part serial numbers, and dates of manufacture.

RFID analysis computer device 310 ranks 665 the parts by proximity to RFID scanner 305. In some embodiments, RFID analysis computer device 310 uses techniques such as Time Difference of Arrival (TDOA) and Received Signal Strength Indicator (RSSI) to determine the distance of the corresponding part relative to RFID scanner 305.

In the example embodiment, RFID analysis computer device 310 sorts 670 the ranked list of parts by part number and updates the contextual database with this ranked list. For each scanned part, RFID analysis computer device 310 lists 675 the number of parts that have the same part number and updates the contextual database with this list.

Figure 9:
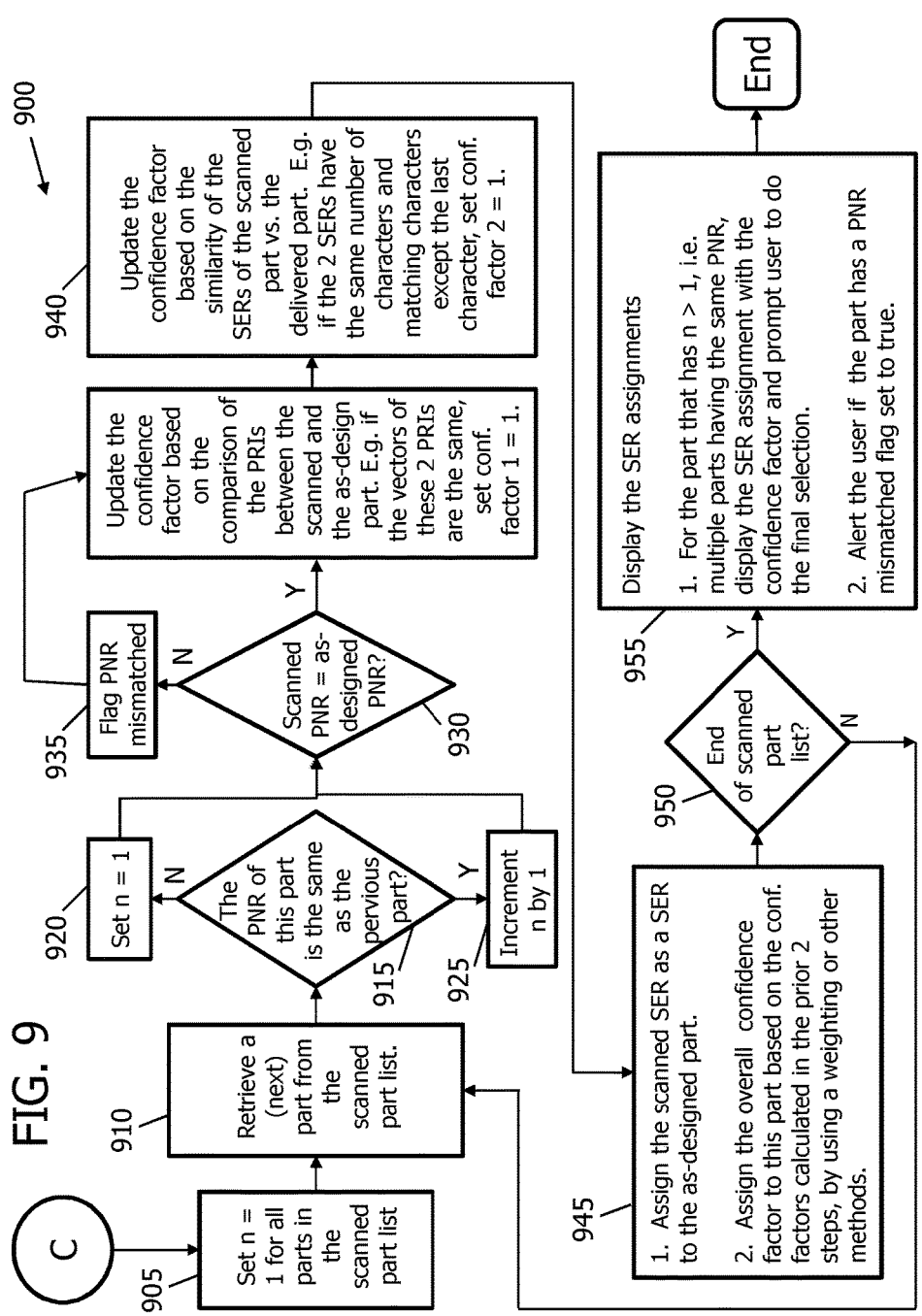

FIG. 9 is a flow chart of a process 900 for pattern matching the "as-designed," "as-delivered," and scanned parts in a vehicle using the systems 100 and 300 (shown in FIGS. 1 & 3). In the example embodiment, process 900 is performed by RFID analysis computer device 310 (shown in FIG. 3).

In the example embodiment, RFID analysis computer device 310 sets 905 a variable n to one (1) for all parts on the scanned part list. RFID analysis computer device 310 performs process 900 to analyze all of the parts on the scanned parts list.

In the example embodiment, RFID analysis computer device 310 retrieves 910 the next part from the scanned part list. RFID analysis computer device 310 checks 915 if the part number of this part is the same as the previous part. If the part numbers are different, then RFID analysis computer device 310 sets 920 n equal to one for this part. If the numbers are different, then RFID analysis computer device 310 increments 925 n by one for that part.

RFID analysis computer device 310 confirms 930 that the scanned part number is the same as the part number that was designated in the "as-designed" configuration 630. If the parts are different, RFID analysis computer device 310 flags 935 the part numbers as being mismatched. RFID analysis computer device 310 calculates or updates 940 a confidence factor based on the comparison of the part numbers of the scanned and "as-designed" parts. In some embodiments, there may be a plurality of parts that may be used at that location. For example, there may be three different parts that the engineers determined were acceptable for that location. In another example, a part may be upgraded over time. In the example embodiment, RFID analysis computer device 310 calculates 940 the confidence score to determine the probability that the scanned part is the correct part for that location. In some embodiments, RFID analysis computer device 310 compares the scanned part to one or more "as-delivered" configurations 640 (shown in FIG. 7) to determine the confidence factor.

RFID analysis computer device 310 assigns 950 the serial number of the part to the "as-designed" part for that location. RFID analysis computer device 310 also assigns the confidence factor to the part based on all of the confidence factors calculated for that part. In some embodiments, different confidence factors may be weighted based on user preferences.

RFID analysis computer device 310 checks 955 to determine if all of the parts in the scanned list have been analyzed. If there are more parts to analyze, RFID analysis computer device 310 retrieves 910 the next part from the scanned list. If there are no more parts to analyze, RFID analysis computer device 310 displays 960 the serial number assignments to the user. In some embodiments, RFID analysis computer device 310 displays multiple parts with the same part number along with the associated confidence factors. In some further embodiments, RFID analysis computer device 310 alerts the user if the mismatch flag was set to true.

Figure 10:
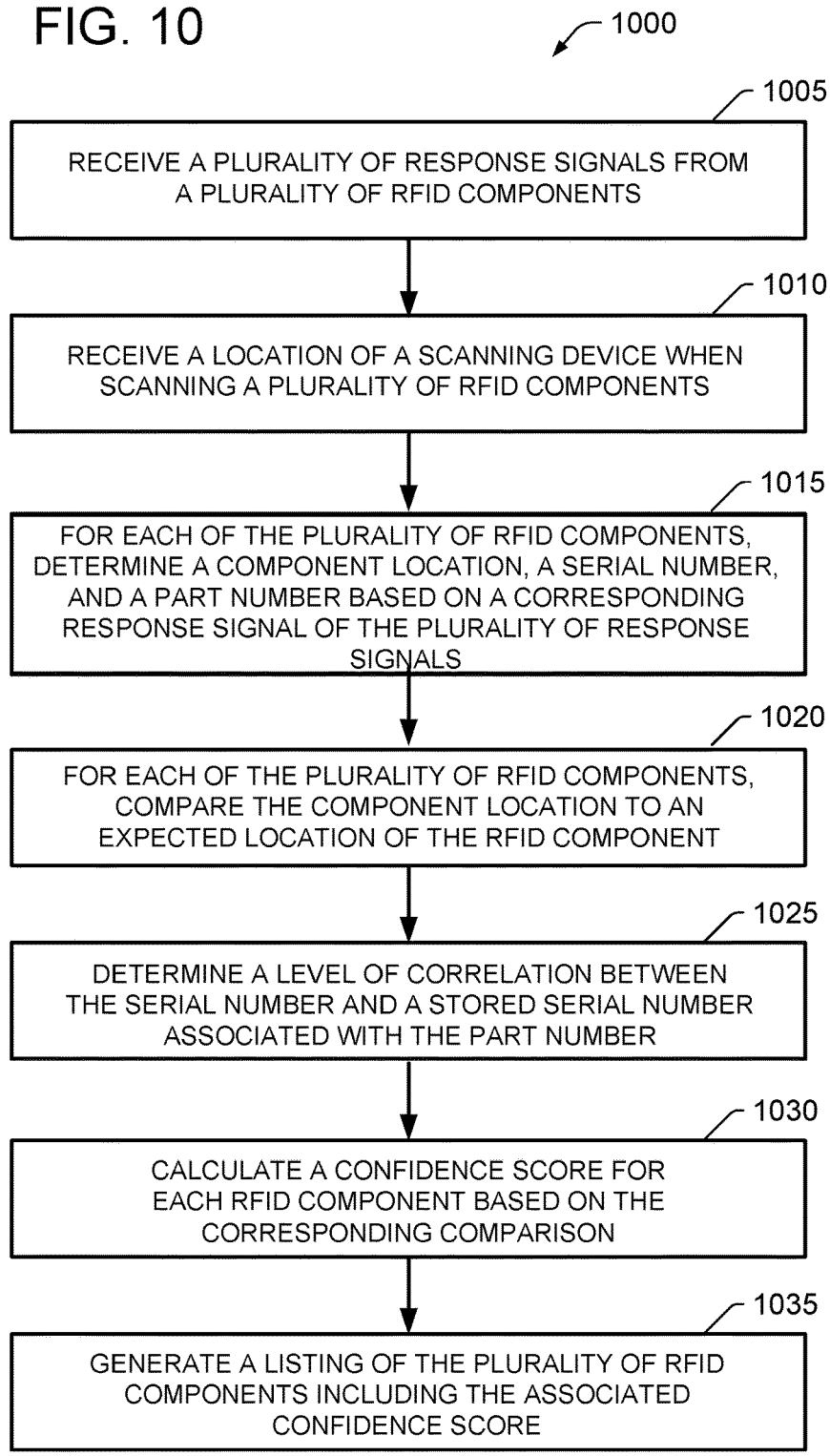

FIG. 10 is a flow chart of a process 1000 for high density radio frequency identifier (RFID) scanning using systems 100 and 300 (shown in FIGS. 1 & 3). In the example embodiment, process 900 is performed by RFID analysis computer device 310 (shown in FIG. 3).

In the example embodiment, RFID analysis computer device 310 receives 1005, from a scanning device (such as RFID scanner 305 shown in FIG. 3), a plurality of response signals from a plurality of RFID components, such as objects 106 (shown in FIG. 1). Each of the plurality of response signals includes a part number and a serial number associated with the RFID component 106. RFID analysis computer device 310 receives 1010, from a location device (such as location computer device 325 shown in FIG. 3), a location of the scanning device 305 when the scanning device 305 received the plurality of response signals.

For each of the plurality of RFID components, RFID analysis computer device 310 determines 1015 a component location, a serial number, and a part number based on a corresponding response signal of the plurality of response signals. For each of the plurality of RFID components, RFID analysis computer device 310 compares 1020 the component location to an expected location of the RFID component.

For each of the plurality of RFID components, RFID analysis computer device 310 determines 1025 a level of correlation between the serial number associated with a response signal for an RFID component (which includes a part number) and a stored serial number associated with the part number. In some embodiments, RFID analysis computer device 310 uses the received part number to look up serial numbers associated with that part number, such as in database 320 (shown in FIG. 3). In these embodiments, database 320 stores serial numbers associated with each part number, where each serial number is of a RFID component 106 that was installed in a previous vehicle, such as "as-delivered" configuration 640 (shown in FIG. 6). In these embodiments, RFID analysis computer device 310 compares the serial number received in the response signal and the store serial number to determine if they match within certain parameters. For example, each serial number is supposed to be unique; therefore, RFID analysis computer device 310 compares the serial numbers based on pattern matching. For example, where a received response signal including a part number and serial number is associated with an RFID component that is a passenger seat, each passenger seat may have a unique serial number 000541XXXX where the last four characters are unique to each seat, while the first six sequential characters match that of stored serial numbers for seats installed in a previous "as-delivered" vehicle. In some embodiments, RFID analysis computer device 310 also compares the part number receives from the response signal to a part number or a plurality of part numbers for the component in the "as-delivered" configuration 640 and/or the "as-designed" configuration 630 (shown in FIG. 3). In these embodiments, the RFID component 106 may have been upgraded from the "as-designed" configuration 630 and have a different part number. In these embodiments, RFID analysis computer device 310 may analyze the part number to determine the extent of the match to determine if the correct part is being used. This analysis may include pattern recognition and/or algorithm matching. For example, the analysis for determining an extent of a match and/or level of correlation, between the serial number associated with a response signal for an RFID component and the stored serial number, may comprise determining the number of sequential characters in the stored serial number that match a corresponding number of sequential characters in the serial number associated with a response signal. In the example embodiment, the closer the correlation between the received serial number and the stored serial number, the higher the level of correlation.

RFID analysis computer device 310 calculates 1030 a confidence score for each RFID component based on the corresponding comparison of the location and the level of correlation. For example, the calculation of the confidence score may comprise a percentage that is based on the number of characters that match between the serial number associated with a response signal and the stored serial number. The calculation of the confidence score may also comprise a weighting or percentage that is based on the level of correlation or proximity of the determined RFID component location to an expected location of the RFID component. For example, a weighting reflecting a high level of correlation may correspond to a proximity within 6 inches, a weighting reflecting a low level of correlation may correspond to a proximity greater than 12 inches, with a medium level of correlation corresponding to a proximity between 6 and 12 inches from the expected location of the RFID component. RFID analysis computer device 310 generates 1035 a listing of the plurality of RFID components including the associated confidence score.

In some embodiments, the location device 325 is also capable of determining an orientation of the scanning device 305. In these embodiments, RFID analysis computer device 310 receives, from the location device 325, the orientation of the scanning device 305. RFID analysis computer device 310 determines the plurality of component locations based on the location and the orientation of the scanning device 305. In some further embodiments, each of the plurality of response signals include a signal strength. RFID analysis computer device 310 determines the component location based on the signal strength of the corresponding response signal.

In some still further embodiments, RFID analysis computer device 310 stores a layout of a vehicle, where the scanning device 305 is a mobile device located in the vehicle. RFID analysis computer device 310 determines the location of the scanning device 305 in relation to the vehicle. For each of the plurality of RFID components, RFID analysis computer device 310 determines the location of the RFID component in the vehicle based on the location in relation to the vehicle of the scanning device 305, the orientation of the scanning device 305, and signal strength of the response signal associated with RFID component.

In some embodiments, each of the plurality of response signals includes a part number associated with the RFID component. RFID analysis computer device 310 stores a plurality of designed RFID components designed to be installed in the vehicle. RFID analysis computer device 310 compares the component location of the RFID component with the plurality of designed RFID components. RFID analysis computer device 310 determines a designed RFID component designated to be at the component location based on the comparison. RFID analysis computer device 310 determines whether the part number of the RFID component matches the designed RFID component. If the determination is that the part number matches the designed RFID component, RFID analysis computer device 310 indicates that the RFID is properly installed. If the determination is that the part number does not match the designed RFID component, RFID analysis computer device 310 transmits an alarm to a user.

In some embodiments, RFID analysis computer device 310 stores a plurality of potential part numbers for the designed RFID component. RFID analysis computer device 310 compares the part number to the plurality of potential part numbers to determine if a match is found. In some further embodiments, RFID analysis computer device 310 stores an algorithm for a potential part number for the designed RFID component and compares the part number to the algorithm to determine if a match is found.

In some embodiments, each of the plurality of response signals includes a part number and a serial number associated with the RFID component. In these embodiments, RFID analysis computer device 310 parses the plurality of response signals by part number. RFID analysis computer device 310 determines a part number associated with more than one response. Then RFID analysis computer device 310 determines a plurality of serial numbers associated with the part number based on the more than one response.

Figure 11:
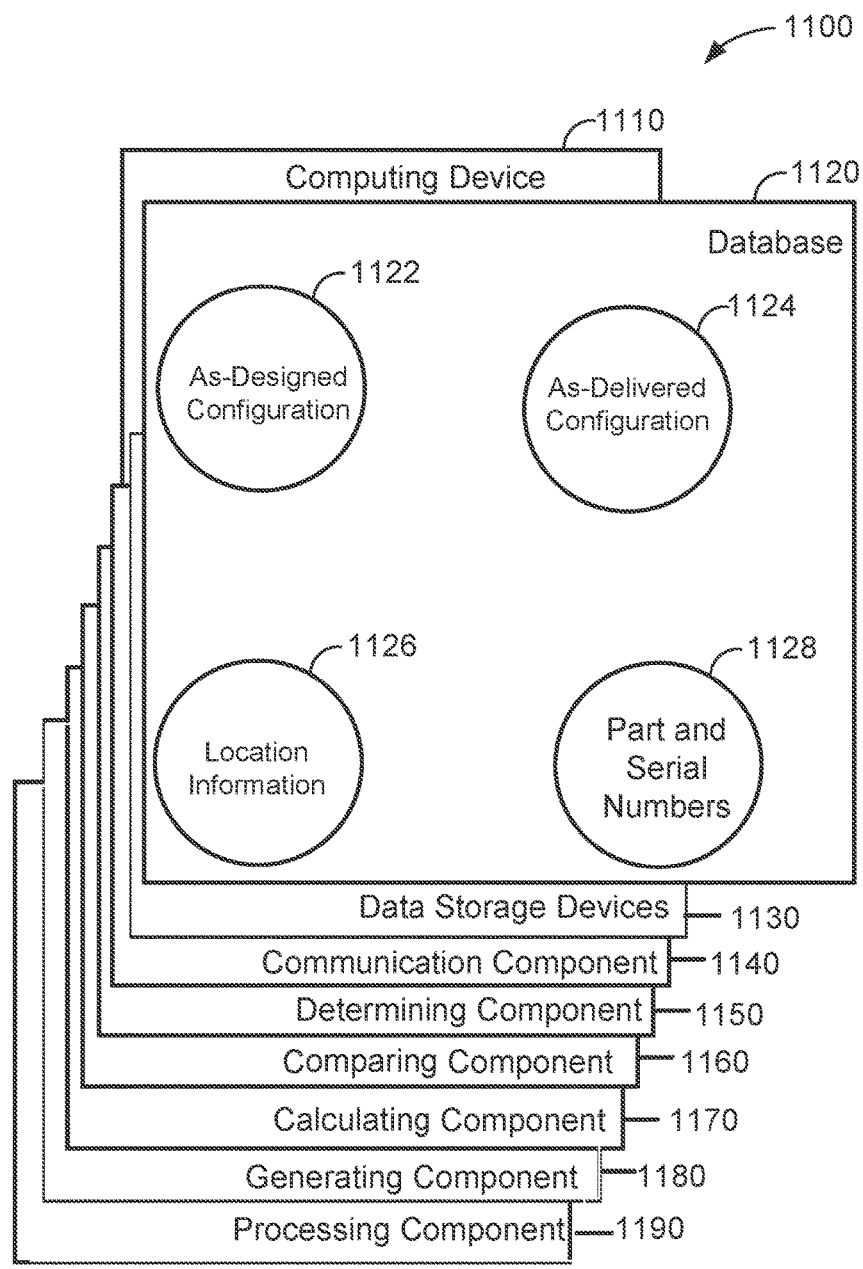

FIG. 11 is a diagram 1100 of components of one or more example computing devices that may be used in system 100 (shown in FIG. 1) and system 300 (shown in FIG. 3). In some embodiments, computing device 1110 is similar to RFID analysis computer device 310 (shown in FIG. 3). Database 1120 may be coupled with several separate components within computing device 1110, which perform specific tasks. In this embodiment, database 1120 includes as-designed configurations 1122, as-delivered configurations 1124, location information 1126, and part numbers and serial numbers 1128. In some embodiments, database 1120 is similar to database 320 (shown in FIG. 3).

Computing device 1110 includes database 1120, as well as data storage devices 1130. Computing device 1110 also includes a communication component 1140 for receiving 1005 a plurality of response signals and receiving 1010 a location of a scanning device when scanning a plurality of RFID components (shown in FIG. 10). Computing device 1110 further includes a determining component 1150 for determining 1015 a component location, a serial number, and a part number based on a corresponding response signal of the plurality of response signals and determining 1025 a level of correlation (both shown in FIG. 10). In addition, computing device 1110 includes a comparing component 1160 for comparing 1020 the component location to an expected location of the RFID component (shown in FIG. 10). Moreover, computing device 1110 includes a calculating component 1170 for calculating 1030 a confidence score for each RFID component based on the corresponding comparison (shown in FIG. 10). Furthermore, computing device 1110 includes a generating component 1180 for generating 1035 a listing of the plurality of RFID components including the associated confidence score (shown in FIG. 10). A processing component 1190 assists with execution of computer-executable instructions associated with the system.

A processor or a processing element may be trained using supervised or unsupervised machine learning, and the machine learning program may employ a neural network, which may be a convolutional neural network, a deep learning neural network, or a combined learning module or program that learns in two or more fields or areas of interest. Machine learning may involve identifying and recognizing patterns in existing data in order to facilitate making predictions for subsequent data. Models may be created based upon example inputs in order to make valid and reliable predictions for novel inputs.

Additionally or alternatively, the machine learning programs may be trained by inputting sample data sets or certain data into the programs, such as image data, previously recognized markings, previously identified parts, previous location analysis based on RFID signal strength, and other data. The machine learning programs may utilize deep learning algorithms that may be primarily focused on pattern recognition, and may be trained after processing multiple examples. The machine learning programs may include Bayesian program learning (BPL), image or object recognition, optical character recognition, pixel recognition, and/or natural language processing—either individually or in combination. The machine learning programs may also include natural language processing, semantic analysis, automatic reasoning, and/or machine learning.

In supervised machine learning, a processing element may be provided with example inputs and their associated outputs, and may seek to discover a general rule that maps inputs to outputs, so that when subsequent novel inputs are provided the processing element may, based upon the discovered rule, accurately predict the correct output. In unsupervised machine learning, the processing element may be required to find its own structure in unlabeled example inputs. In one embodiment, machine learning techniques may be used to extract data about a part, one or more markings, image data, and/or other data.

Based upon these analyses, the processing element may learn how to identify characteristics and patterns that may then be applied to analyzing engineering drawings, image data, and/or other data. For example, the processing element may learn to identify a location of an object among a plurality of objects. The processing element may also learn how to recognize related part numbers.

The computer-implemented methods discussed herein may include additional, less, or alternate actions, including those discussed elsewhere herein. The methods may be implemented via one or more local or remote processors, transceivers, servers, and/or sensors (such as processors, transceivers, servers, and/or sensors mounted on vehicles or mobile devices, or associated with smart infrastructure or remote servers), and/or via computer-executable instructions stored on non-transitory computer-readable media or medium. Additionally, the computer systems discussed herein may include additional, less, or alternate functionality, including that discussed elsewhere herein. The computer systems discussed herein may include or be implemented via computer-executable instructions stored on non-transitory computer-readable media or medium.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and/or a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

As described above, the implementations described herein relate to radio frequency identifier ("RFID") part scanning, and more specifically, to scanning, identifying, and verifying a plurality of closely located parts with RFID tags. More specifically, an RFID analysis computer device (also known as an RFID analysis server) analyzes received RFID signals to locate and identify the parts in an area with a high concentration of RFID tags. The RFID analysis computer device compares the identified parts to potential parts at that location to confirm that the proper parts are identified.

The above-described methods and systems for high density RFID part scanning are cost-effective, secure, and highly reliable. The methods and systems include receiving a location of a scanning device when scanning a plurality of RFID components, determining a component location based on a corresponding response signal of the plurality of response signals for each of the plurality of RFID components, compare the component location to an expected location of the RFID component for each of the plurality of RFID components, calculate a confidence score for each RFID component based on the corresponding comparison; and generate a listing of the plurality of RFID components including the associated confidence score. Accordingly, the methods and systems facilitate improving the use and efficiency of RFID scanning by reducing the number of scans required to identify and locate a plurality of objects.

The methods and system described herein may be implemented using computer programming or engineering techniques including computer software, firmware, hardware, or any combination or subset. As disclosed above, at least one technical problem with prior systems is that there is a need for systems for a cost-effective and reliable manner for converting engineering drawings. The system and methods described herein address that technical problem. The technical effect of the systems and processes described herein is achieved by performing at least one of the following steps: (a) receiving, from a scanning device, a plurality of response signals from a plurality of RFID components; (b) receiving, from a location device, a location of the scanning device when the scanning device received the plurality of response signals; (c) for each of the plurality of RFID components, determining a component location based on a corresponding response signal of the plurality of response signals; (d) for each of the plurality of RFID components, comparing the component location to an expected location of the RFID component; (e) calculating a confidence score for each RFID component based on the corresponding comparison; and (f) generating a listing of the plurality of RFID components including the associated confidence score.

The resulting technical effect is locating, identifying, and verifying parts with RFID tags in an area with a high density of RFID tagged parts.

This written description uses examples to disclose various implementations, including the best mode, and also to enable any person skilled in the art to practice the various implementations, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system for high density radio frequency identifier (RFID) scanning comprising:
an RFID scanning device programmed to transmit an RFID interrogation signal and receive a plurality of response signals from a plurality of RFID tagged components;
a location device programmed to determine a location of said RFID scanning device;
an RFID analysis computer device in communication with said RFID scanning device and said location device, said RFID analysis computer device comprising at least one processor in communication with at least one memory device, said RFID analysis computer device programmed to:
store a plurality of data for a plurality of RFID tagged components including part numbers, serial numbers, and expected locations for each of the plurality of RFID tagged components;
instruct said RFID scanning device to transmit an RFID interrogation signal;
receive, from said RFID scanning device, a plurality of response signals from a plurality of RFID tagged components, wherein each of the plurality of response signals includes a part number and a serial number associated with the RFID tagged component; and
receive, from said location device, a location of said RFID scanning device when said RFID scanning device receives the plurality of response signals;
for each of the plurality of RFID tagged components, said RFID analysis computer device is further programmed to:
determine a component location, the serial number, and the part number based on a corresponding response signal of the plurality of response signals;
compare the component location to an expected location of the RFID tagged component;
determine a level of correlation between the serial number associated with the corresponding response signal for the RFID tagged component and a stored serial number associated with the part number; and
calculate a confidence score based on the level of correlation between the serial number associated with the corresponding response signal for the RFID tagged component and the stored serial number associated with the part number and based on the comparison of the component location to the expected location; and
wherein said RFID analysis computer device is further programmed to generate a listing of the plurality of RFID tagged components including the associated confidence score for each of the RFID tagged components.

2. A system in accordance with claim 1, wherein said location device is also programmed to determine an orientation of said RFID scanning device, and wherein said RFID analysis computer device is further programmed to:
receive, from said location device, the orientation of said RFID scanning device; and
determine the component location based on the location and the orientation of said RFID scanning device.

3. A system in accordance with claim 2, wherein the plurality of response signals include a signal strength, and wherein said RFID analysis computer device is further programmed to determine the component location based on the signal strength of the corresponding response signal.

4. A system in accordance with claim 3, wherein said RFID analysis computer device is further programmed to:
store a layout of a vehicle, wherein said RFID scanning device is a mobile device located inside the vehicle;
determine the location of said RFID scanning device in the vehicle; and
for each of the plurality of RFID tagged components, determine the location of an RFID tagged component of the plurality of RFID tagged components in the vehicle based on the location in the vehicle of said RFID scanning device, the orientation of said RFID scanning device, and signal strength of the response signal associated with said RFID tagged component.

5. A system in accordance with claim 1, wherein said RFID analysis computer device is further configured to:
store a plurality of designed RFID tagged components designed to be installed in a vehicle;
compare the component location of the RFID tagged component with the plurality of designed RFID tagged components;
determine a designed RFID tagged component designated to be at the component location based on the comparison;
determine whether the part number of the RFID tagged component matches the designed RFID tagged component; and
if the determination is that the part number matches the designed RFID tagged component, indicate that the RFID is properly installed.

6. A system in accordance with claim 5, wherein said RFID analysis computer device is further configured to:
if the determination is that the part number does not match the designed RFID tagged component, transmit an alarm to a user.

7. A system in accordance with claim 5, wherein said RFID analysis computer device is further programmed to:
store a plurality of potential part numbers for each of the plurality of designed RFID tagged components; and
compare the part number to the plurality of potential part numbers to determine if a match is found.

8. A system in accordance with claim 5, wherein said RFID analysis computer device is further programmed to:
store an algorithm for a potential part number for each of the plurality of designed RFID tagged components; and
compare the part number to the algorithm to determine if a match is found.

9. A system in accordance with claim 1, wherein said RFID analysis computer device is further configured to:
parse the plurality of response signals by part number;
determine the part number associated with more than one response; and
determine a plurality of serial numbers associated with the part number based on the more than one response.

10. A system in accordance with claim 1, wherein the stored serial number corresponds to an RFID tagged component with the part number that was in a previously delivered vehicle of a similar configuration, and wherein said RFID analysis computer device is further configured to:
compare the serial number associated with the corresponding response signal for the RFID tagged component to the stored serial number to determine an extent of a match between the serial number and the stored serial number; and determine the level of correlation between the serial number and the stored serial number associated with the part number based on the extent of the match.

11. A method for high density radio frequency identifier (RFID) scanning, the method implemented using a computing device comprising at least one processor in communication with at least one memory device, the computing device in communication with an RFID scanning device and a location device associated with the RFID scanning device, the method comprising:
storing a plurality of data for a plurality of RFID tagged components including part numbers, serial numbers, and expected locations for each of the plurality of RFID tagged components;
instructing the RFID scanning device to transmit an RFID interrogation signal;
receiving, from the RFID scanning device, a plurality of response signals from a plurality of RFID tagged components, wherein each of the plurality of response signals includes a part number and a serial number associated with the RFID tagged component;
receiving, from a location device, a location of the RFID scanning device when the RFID scanning device received the plurality of response signals;
for each of the plurality of RFID tagged components, determining a component location, the serial number, and the part number based on a corresponding response signal of the plurality of response signals;
for each of the plurality of RFID tagged components, comparing the component location to an expected location of the RFID tagged component;
for each of the plurality of RFID tagged components, determining a level of correlation between the serial number associated with the corresponding response signal for the RFID tagged component and a stored serial number associated with the part number;
for each of the plurality of RFID tagged components, calculating a confidence score based on the level of correlation between the serial number associated with the corresponding response signal for the RFID tagged component and the stored serial number associated with the part number and based on the comparison of the component location to the expected location; and
generating a listing of the plurality of RFID tagged components including the associated confidence score for each of the RFID tagged components.

12. A method in accordance with claim 11, wherein the location device is also programmed to determine an orientation of the RFID scanning device, and wherein said method further comprises:
receiving, from the location device, the orientation of the RFID scanning device; and
determining the component location based on the location and the orientation of the RFID scanning device.

13. A method in accordance with claim 12, wherein the plurality of response signals include a signal strength, and wherein said method further comprises determining the component location based on the signal strength of the corresponding response signal.

14. A method in accordance with claim 13 further comprising:
storing a layout of a vehicle, wherein the RFID scanning device is a mobile device located in the vehicle;
determining the location of the RFID scanning device in relation to the vehicle; and
for each of the plurality of RFID tagged components, determining the location of the RFID tagged component in the vehicle based on the location in relation to the vehicle of the RFID scanning device, the orientation of the RFID scanning device, and signal strength of the response signal associated with the RFID tagged components.

15. A method in accordance with claim 11, wherein said method further comprises:
storing a plurality of designed RFID tagged components designed to be installed in a vehicle;
comparing the component location of the RFID tagged component with the plurality of designed RFID tagged components;
determining a designed RFID tagged component designated to be at the component location based on the comparison;
determining whether the part number of the RFID tagged component matches the designed RFID tagged component; and
if the determination is that the part number matches the designed RFID tagged component, indicating that the RFID is properly installed.

16. A method in accordance with claim 15 further comprising if the determination is that the part number does not match the designed RFID tagged component, transmitting an alarm to a user.

17. A method in accordance with claim 15 further comprising:
storing a plurality of potential part numbers for each of the plurality of designed RFID tagged components; and
comparing the part number to the plurality of potential part numbers to determine if a match is found.

18. A method in accordance with claim 15 further comprising:
storing an algorithm for a potential part number for each of the plurality of designed RFID tagged components; and
comparing the part number to the algorithm to determine if a match is found.

19. A method in accordance with claim 11, wherein said method further comprises:
parsing the plurality of response signals by part number;
determining the part number associated with more than one response; and
determining a plurality of serial numbers associated with the part number based on the more than one response.

20. A computer device for high density radio frequency identifier (RFID) scanning comprising at least one processor in communication with at least one memory device, said at least one processor programmed to:
store a plurality of data for a plurality of RFID tagged components including part numbers, serial numbers, and expected locations for each of the plurality of RFID tagged components;
instruct an RFID scanning device to transmit an RFID interrogation signal;
receive, from the RFID scanning device, a plurality of response signals from a plurality of RFID tagged components, wherein each of the plurality of response signals includes a part number and a serial number associated with the RFID tagged component;
receive, from a location device, a location of the RFID scanning device when the RFID scanning device received the plurality of response signals;
for each of the plurality of RFID tagged components, determine a component location, the serial number, and the part number based on a corresponding response signal of the plurality of response signals;

for each of the plurality of RFID tagged components, compare the component location to an expected location of the RFID tagged component;
for each of the plurality of RFID tagged components, determine a level of correlation between the serial number associated with the corresponding response signal for the RFID tagged component and a stored serial number associated with the part number;
for each of the plurality of RFID tagged components, calculate a confidence score based on the level of correlation between the serial number associated with the corresponding response signal for the RFID tagged component and the stored serial number associated with the part number and based on the comparison of the component location to the expected location; and
generate a listing of the plurality of RFID tagged components including the associated confidence score for each of the RFID tagged components.

* * * * *